United States Patent
Masuda

(10) Patent No.: US 9,963,131 B2
(45) Date of Patent: May 8, 2018

(54) ELECTRIC BRAKE CONTROL SYSTEM

(71) Applicant: NTN Corporation, Osaka (JP)

(72) Inventor: Yui Masuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 10 days.

(21) Appl. No.: 14/894,540

(22) PCT Filed: May 21, 2014

(86) PCT No.: PCT/JP2014/063474
§ 371 (c)(1),
(2) Date: Nov. 30, 2015

(87) PCT Pub. No.: WO2014/196361
PCT Pub. Date: Dec. 11, 2014

(65) Prior Publication Data
US 2016/0129895 A1    May 12, 2016

(30) Foreign Application Priority Data

Jun. 3, 2013   (JP) .................................. 2013-116779

(51) Int. Cl.
  *B60T 8/1755*   (2006.01)
  *B60T 13/74*    (2006.01)
  (Continued)

(52) U.S. Cl.
CPC .......... *B60T 8/1755* (2013.01); *B60T 13/741* (2013.01); *F16D 55/226* (2013.01); *F16D 65/18* (2013.01);
(Continued)

(58) Field of Classification Search
CPC ...... B60T 8/1755; B60T 13/741; F16D 65/18; F16D 2121/24; F16D 55/226;
(Continued)

(56) References Cited

U.S. PATENT DOCUMENTS

| 5,707,118 A | 1/1998 | Kolberg et al. |
| 2004/0026991 A1* | 2/2004 | Suzuki ................. B60T 8/3255 303/113.2 |

(Continued)

FOREIGN PATENT DOCUMENTS

| CN | 102917926 | 2/2013 |
| DE | 102 48 852 | 5/2003 |

(Continued)

OTHER PUBLICATIONS

Extended European Search Report dated Nov. 14, 2016 in corresponding European Application No. 14807546.8.

(Continued)

*Primary Examiner* — Nga X Nguyen
(74) *Attorney, Agent, or Firm* — Wenderoth, Lind & Ponack, L.L.P.

(57) ABSTRACT

Two electric brake devices are mounted to respective wheels of a vehicle and each include an electric motor. If fluctuations in braking force occurs in one of the two electric brake devices, a control device calculates operating quantities of the respective electric brake devices based on the deviation between a command value of the sum of the braking forces of the electric brake devices and the sum of the feedback values of the braking forces of the electric brake devices, and causes both electric control devices to perform compensation operations for compensating for the braking force fluctuations while keeping constant the sum of the respective braking forces. This makes it possible to effectively reduce the braking force fluctuations even if the operating amplitudes of the individual electric brake devices are small.

10 Claims, 5 Drawing Sheets

(51) Int. Cl.
*F16D 65/18* (2006.01)
*F16D 55/226* (2006.01)
*F16D 121/24* (2012.01)
*F16D 125/40* (2012.01)
*F16D 125/50* (2012.01)

(52) U.S. Cl.
CPC ...... *F16D 2121/24* (2013.01); *F16D 2125/40* (2013.01); *F16D 2125/50* (2013.01)

(58) Field of Classification Search
CPC ............. F16D 2125/40; F16D 2125/50; F16C 55/226; F16C 65/18; F16C 2125/40; F16C 2125/50; F16C 2121/24
USPC ........................................................... 701/70
See application file for complete search history.

(56) References Cited

U.S. PATENT DOCUMENTS

| | | | |
|---|---|---|---|
| 2007/0138861 A1 | 6/2007 | Kawahara et al. | |
| 2008/0048596 A1* | 2/2008 | Konishi | B60T 7/042 318/372 |
| 2008/0091326 A1* | 4/2008 | Watanabe | B60T 13/741 701/70 |
| 2013/0085650 A1* | 4/2013 | Nakamura | B60T 1/10 701/71 |
| 2014/0052339 A1 | 2/2014 | Takahashi et al. | |

FOREIGN PATENT DOCUMENTS

| | | |
|---|---|---|
| JP | 06-327190 | 11/1994 |
| JP | 11-512367 | 10/1999 |
| JP | 2000-283193 | 10/2000 |
| WO | 2012/144065 | 10/2012 |

OTHER PUBLICATIONS

International Search Report dated Aug. 19, 2014 in International (PCT) Application No. PCT/JP2014/063474.
Written Opinion of the International Searching Authority dated Aug. 19, 2014 in International (PCT) Application No. PCT/JP2014/063474 (with English translation).
Office Action dated May 2, 2017 in Chinese Patent Application No. 201480031156.4, with English-language translation.

* cited by examiner

ELECTRIC BRAKE CONTROL SYSTEM

TECHNICAL FIELD

This invention relates to an electric brake control system for controlling the braking generated by electric brake devices each mounted to one of a plurality of wheels of a vehicle.

BACKGROUND ART

Many of old vehicle brake devices are hydraulic ones. However, with an introduction of sophisticated brake control arrangements such as anti-lock brake systems (ABS), electric brake devices, which are capable of carrying out such sophisticated brake control without the need for a complicated hydraulic circuit, are becoming popular today. An electric brake devices includes an electric linear motion actuator including a linear motion mechanism for converting the rotary motion of an electric motor to a linear motion of brake pads, and is configured such that when the electric motor is activated by e.g. a signal generated when a brake pedal is depressed, the brake pads are linearly driven by the linear motion actuator and pressed against a brake disk, thus applying a braking force to the wheel (see e.g., the below-identified Patent document 1).

In this electric brake device, cyclic fluctuations in braking force could occur during braking if the brake disk becomes worn unevenly, which could result in abnormal vibration of the vehicle body.

The below-identified Patent document 2 proposes to reduce fluctuations in braking force and thus to prevent abnormal vibration of the vehicle body, by detecting the frequency of the cyclic fluctuations in braking force generated by the electric brake device, and actuating the electric brake device in opposite phase to the braking force fluctuations if the frequency detected is proportional to the wheel speed.

PRIOR ART DOCUMENTS

Patent Documents

Patent document 1: JP Patent Publication 6-327190A
Patent document 2: JP Patent Publication 2000-283193A

SUMMARY OF THE INVENTION

Object of the Invention

In the method for preventing abnormal vibration proposed in Patent document 2, even though electric brake devices are mounted to a plurality of wheels of a vehicle, since only the electric brake device in which cyclic fluctuations in braking force is occurring is controlled to reduce the fluctuations in braking force, a high-output electric motor is needed for each electric brake device, which increases the manufacturing cost and the power consumption, and could also increase the installation space.

An object of the present invention is to effectively reduce cyclic fluctuations in braking generated by electric brake devices mounted to a plurality of wheels of a vehicle, without increasing the outputs of electric motors of the respective electric brake devices.

Means for Achieving the Object

In order to achieve this object, the present invention provides an electric brake control system comprising electric brake devices each mounted to each of a plurality of wheels of a vehicle, and configured to convert a rotary motion of an electric motor to a linear motion, thereby applying a braking force to a corresponding one of the wheels, and at least one control device for controlling braking forces of the respective electric brake devices, wherein the control device is configured, if braking force fluctuations occur in one of the electric brake devices, to cause the one of the electric brake devices and another or others of the electric brake devices to perform compensation operations for compensating for the braking force fluctuations while keeping constant a sum of the respective braking forces.

With this arrangement, since compensation operations for cyclic fluctuations in braking force generated in one electric brake device are performed by a plurality of electric brake devices including said one electric brake device, it is possible to effectively reduce the fluctuations in braking force even if the operating amplitudes of the individual electric brake devices are small. Thus, compared to the above-described conventional method for preventing abnormal vibrations, it is possible to reduce the outputs required for the electric motors of the respective electric brake devices.

The control device may be configured to determine the upper limits of the operating amplitudes of the electric brake devices which are performing the compensation operations, based on the frequency of the braking force fluctuations, and the frequency characteristics of the yaw rate (rate at which the rotational angle in the turning direction changes) corresponding to the braking force moment about the center of gravity of the vehicle (this moment is hereinafter sometimes also referred to as the "turning moment"). With this arrangement, it is possible to set the upper limits of the operating amplitudes of the electric brake devices which are performing the compensation operations to maximum values within the range in which the turning moment generated by the compensation operations does not influence the vehicle behavior, which in turn makes it possible to further effectively reduce the fluctuations in braking force.

In an alternative arrangement, at least one of the electric brake devices is located on each of the first to fourth quadrants of a coordinate plane of which the origin is on the center of gravity of the vehicle, and the control device is configured to cause the electric brake device in which the braking force fluctuations are occurring and another one of the electric brake devices located on one of the first to fourth quadrants that is located adjacent, in the fore-and-aft direction of the vehicle, to one of the first to fourth quadrants where the electric brake device in which the braking force fluctuations are occurring is located, to perform the compensation operations. With this arrangement, since the turning moment generated between the front wheels and the turning moment generated between the rear wheels cancel each other, the turning moments are less likely to influence the vehicle behavior, which in turn makes it possible to increase the upper limits of the electric brake devices performing the compensation operations, thereby more effectively reduce the braking force fluctuations.

In a specific arrangement for performing the compensation operations, the control device is configured to receive a command value of the sum, and feedback values, of the braking forces of the electric brake devices performing the compensation operations, and to calculate operating quantities of the electric brake devices performing the compensation operations based on a deviation between the command value and a sum of the feedback values. In another specific arrangement for performing the compensation operations, said at least one control device comprises a plurality of control devices, each of the control devices includes a disturbance estimating unit for estimating disturbances that could cause braking force fluctuations, and the control devices are configured such that each of corresponding ones of the control devices calculates the operating quantity of each of the electric brake devices performing the compensation operations, based on a deviation between a command value and a feedback value of a braking force, of the corresponding one of the electric brake devices, and disturbances estimated by the corresponding one of the disturbance estimating units.

Advantages of the Invention

Since the electric brake control system according to the present invention is configured, as described above, to reduce cyclic fluctuations on braking force generated in one electric brake device by the compensation operations in a plurality of electric brake devices, it is possible to use electric motors for the respective electric brake devices which are lower in output than the those used in conventional systems, thereby making it possible to reduce the manufacturing cost and power consumption of the electric motors, and to reduce the installation space.

Otherwise, by using electric motors whose outputs are substantially equal to those used in conventional systems, it is possible to increase the range of braking force fluctuations which can be compensated for, thereby improving the quality of the electric brake control system.

BEST MODE FOR EMBODYING THE INVENTION

Figure 1:
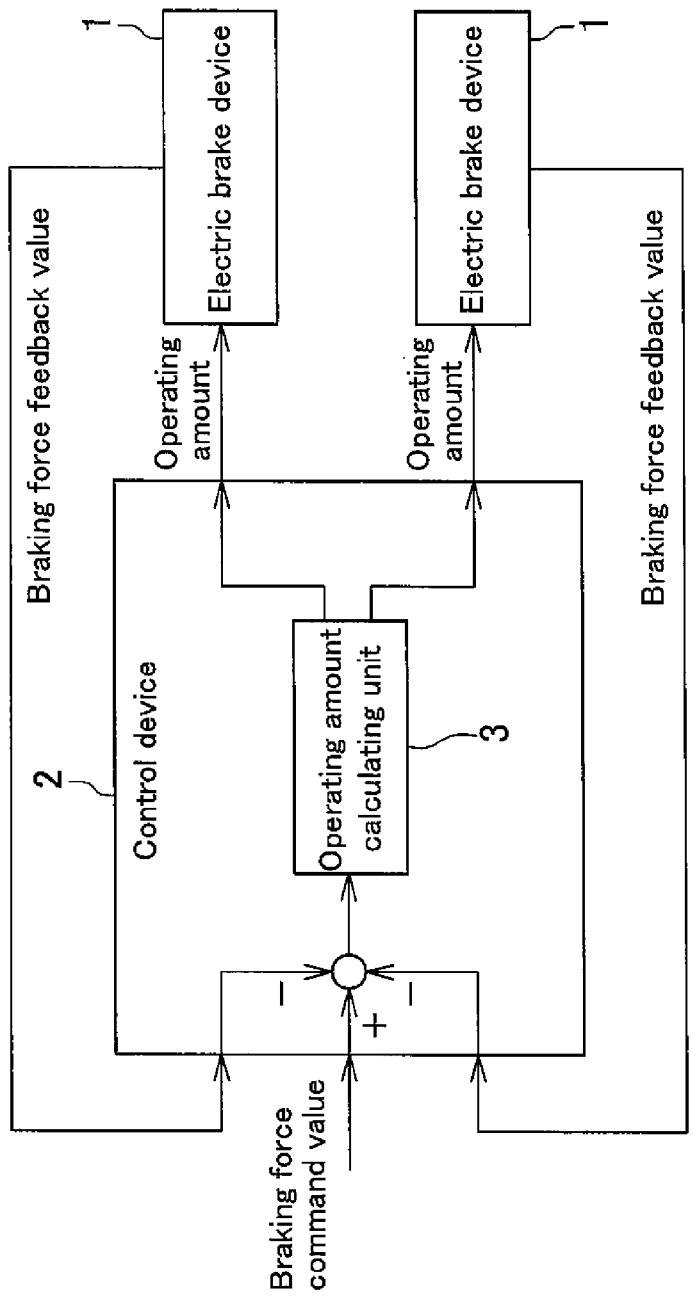
FIG. 1 shows an entire electric brake control system of a first embodiment.

The embodiments of the present invention are now described with reference to the drawings. FIG. 1 shows the entire electric brake control system according to the first embodiment. This electric brake control system includes electric brake devices 1 mounted to two respective vehicle wheels, and a control device 2 for controlling the braking forces of the respective electric brake devices 1. The control device 2 is configured such that if there are fluctuations in braking force generated by either one of the electric brake devices 1, the control device 2 causes the respective electric brake devices 1 to perform compensation operations for compensating for the fluctuations in braking force.

Figure 2:
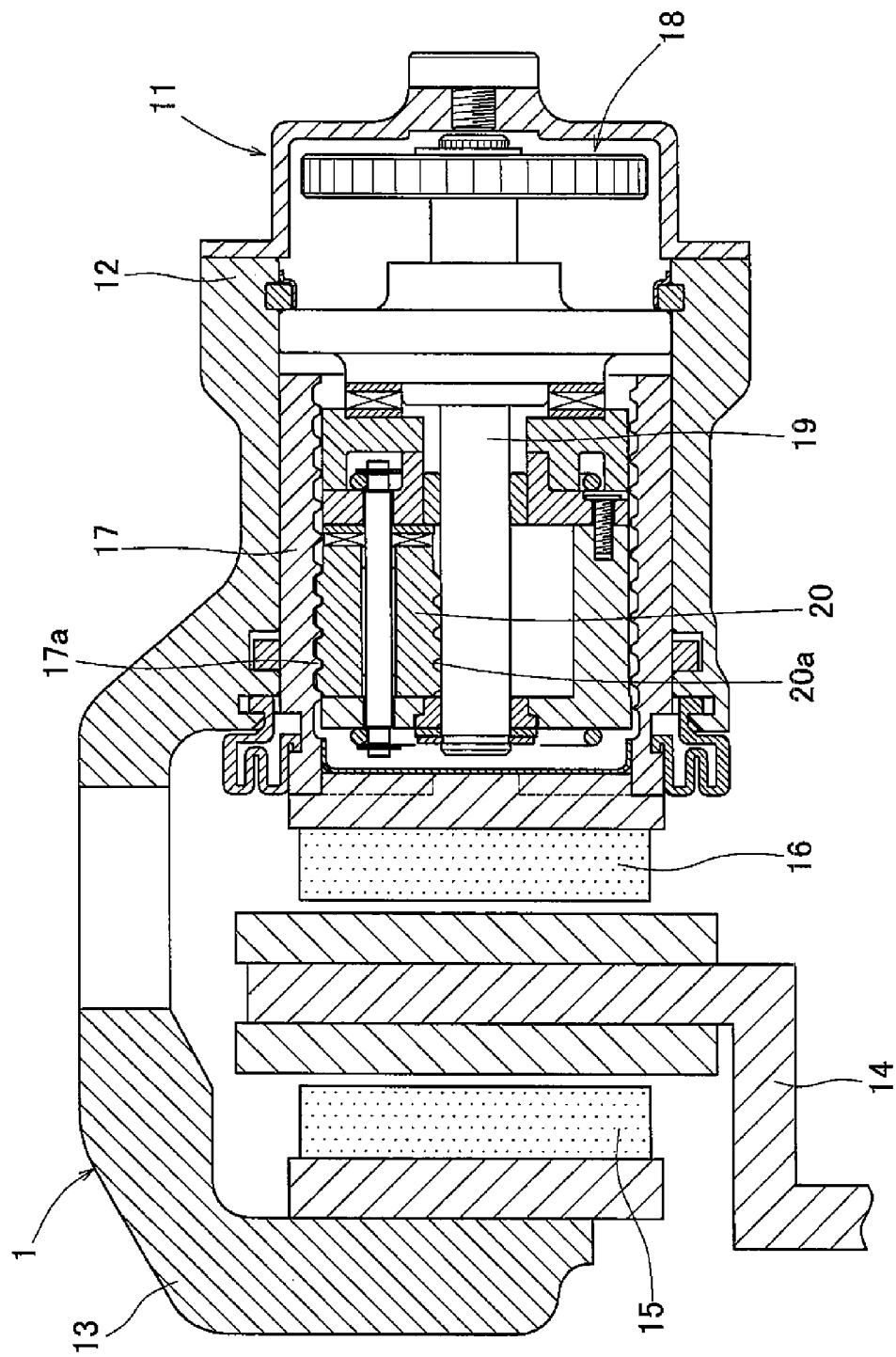
FIG. 2 is a vertical sectional front view of a portion of an electric brake device of FIG. 1.

As shown in FIG. 2, each of the electric brake devices 1 includes an electric linear motion actuator 11 having a housing 12, a caliper body 13 integral with the housing 12, a brake disk 14 arranged such that its peripheral portion is partially located in the caliper body 13, and a stationary brake pad 15 and a movable brake pad 16 provided on the respective sides of the brake disk 14 with the movable brake pad 16 fixedly coupled to an outer ring member 17 of the electric linear motion actuator 11.

The electric linear motion actuator 11 includes a rotary shaft 19 to which the rotation of the rotor shaft of an electric motor, not shown, is transmitted through a gear reduction mechanism 18, and is configured to convert the rotary motion of the rotary shaft 19 to a linear motion of an outer ring member 17. The linear motion mechanism that converts the rotary motion to the linear motion includes a plurality of planetary rollers 20 mounted between the rotary shaft 19 and the outer ring member 17, and having helical grooves 20a formed on the radially outer surfaces thereof and in engagement with a helical rib 17a formed on the radially inner surface of the outer ring member 17 such that due to elastic contact with the radially outer surface of the rotary shaft 19, the planetary rollers 20 are rotated about their respective center axes while revolving around the rotary shaft 19, thereby moving the outer ring member 17 in the axial direction.

Accordingly, when the electric motor of the electric linear motion actuator 11 is driven to move the outer ring member 17 in the direction toward the brake disk 14, the movable brake pad 16, which is fixedly coupled to the outer ring member 17, and the stationary brake pad 15 clamp the brake disk 14 therebetween, thereby applying a braking force to the wheel to which the brake disk 14 is mounted.

As shown in FIG. 1, the control device 2 receives a command value of the sum of the braking forces to be applied to the respective two electric brake devices 1, and feedback values of the braking forces generated by the respective electric brake devices 1. The control device 2 calculates, in an operating quantity calculating unit 3, operating quantities based on the deviation between the command value and the sum of the feedback values of the braking forces generated by the respective electric brake devices 1, and applies the thus calculated operating quantities to the respective electric brake devices 1. In particular, the operating quantity calculating unit 3 first calculates the total operating quantity based on the deviation between the command value and the sum of the feedback values, then divides the thus calculated total operating quantity by the number of the electric brake devices 1 (two in the embodiment), and applies the thus obtained value to the respective electric brake devices 1 as the operating quantities. However, the operating quantities to be distributed to the respective electric brake devices 1 may be calculated at a distribution rate determined under different conditions.

The control device 2 is thus configured to cause the two respective electric brake devices 1 to perform compensation operations for compensating for any fluctuations in the braking force generated by one of the electric brake devices 1, while keeping constant the sum of the braking forces generated by the respective electric brake devices 1.

Figure 3:
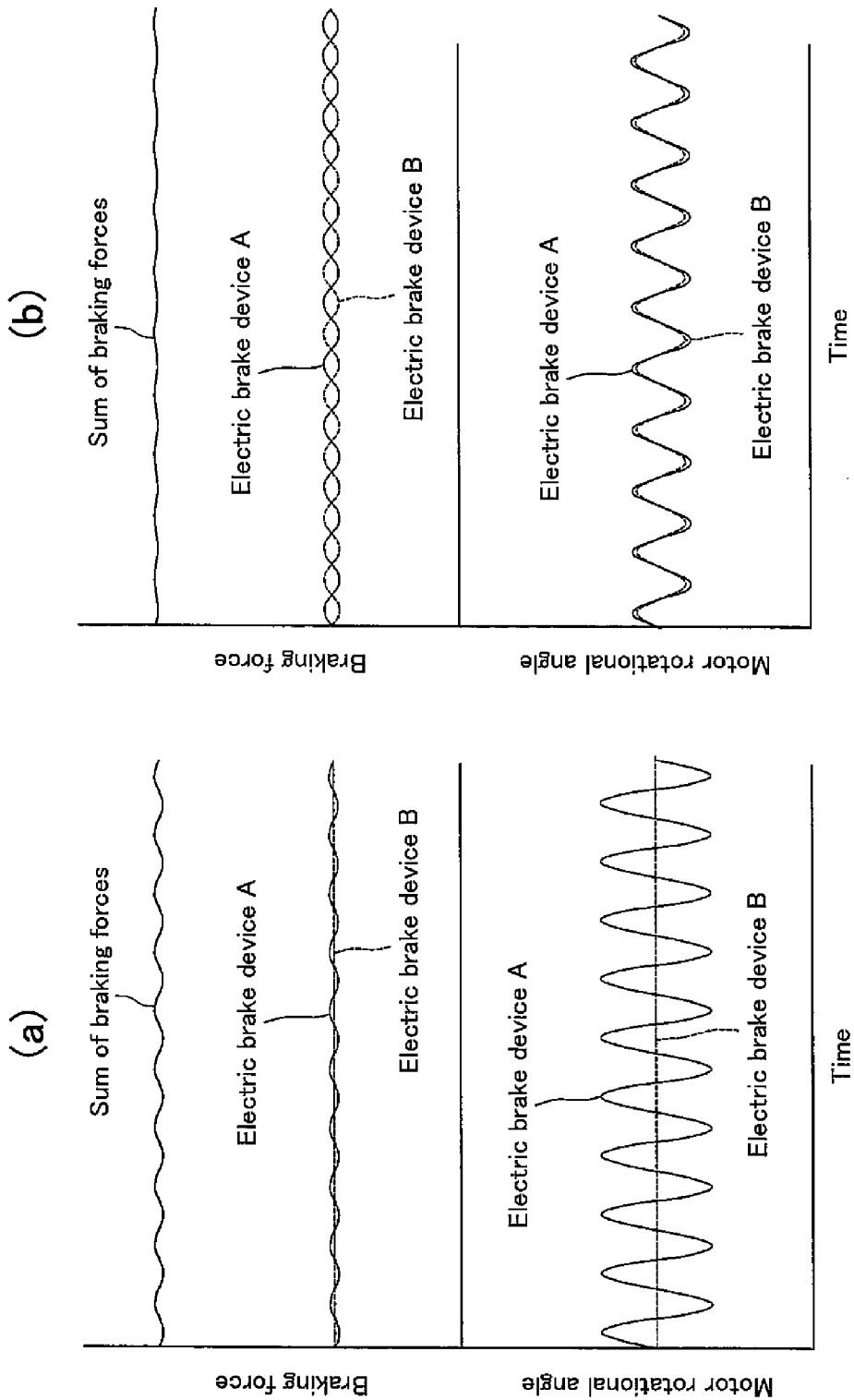
FIG. 3(a) is a graph showing the behavior of a conventional control.
FIG. 3(b) is a graph showing the control behavior of the electric brake control system of FIG. 1.

FIGS. 3(a) and 3(b) show images of the control by the electric brake control system according to the present invention, compared to that of a conventional brake control system. In the conventional system, if, during braking operation by two electric brake devices A and B, cyclic fluctuations in braking force generated by the electric brake device A occurs, only the electric brake device A, of which the braking force is fluctuating, performs the compensation operation as shown in FIG. 3(a). This not only increases the operating amplitude of the electric brake device A (shown in the figure as the amplitude of variation in the rotation angle of the motor), but also makes it impossible to completely eliminate fluctuations in braking force generated by the electric brake device A alone, as well as fluctuations in the sum of the braking forces generated by the respective electric brake devices. In contrast, as shown in FIG. 3(b), since the control device according to the present invention causes both the electric brake devices A and B to perform compensation operations using an operating amplitude smaller than the operating amplitude used for the conventional electric brake device A, while the fluctuations in braking force generated by the electric brake device A alone are slightly larger than the fluctuation in braking force generated by the conventional electric brake device A, the sum of the braking forces generated by the respective brake devices are kept constant because the control device causes the electric brake device B to operate such that the braking force generated by the electric brake device B fluctuates in opposite phase to the braking force generated by the electric brake device A.

Since, compared to conventional arrangements, the electric brake control system according to the present invention is capable of reducing the operating amplitudes of the braking forces generated by the respective electric brake devices, fluctuations in braking force of the entire vehicle can be easily compensated for, and it is also possible to use lower-output electric motors for the respective electric brake devices, which makes it possible to reduce manufacturing cost, power consumption and installation spaces.

If the two electric brake devices 1 of the electric brake control system according to the present invention are provided on the right and left sides of the vehicle, respectively, there may be a difference in braking force between the right and left sides of the vehicle. Such a difference will result in a turning moment not intended by the driver about the center of gravity. It is however possible to reduce the influence of such a turning moment on the vehicle behavior by limiting the operating amplitudes of the compensation operations by the respective electric brake devices 1 based on the frequencies of the braking force fluctuations and the frequency characteristics of the yaw rate corresponding to the turning moment of the vehicle.

Figure 4:
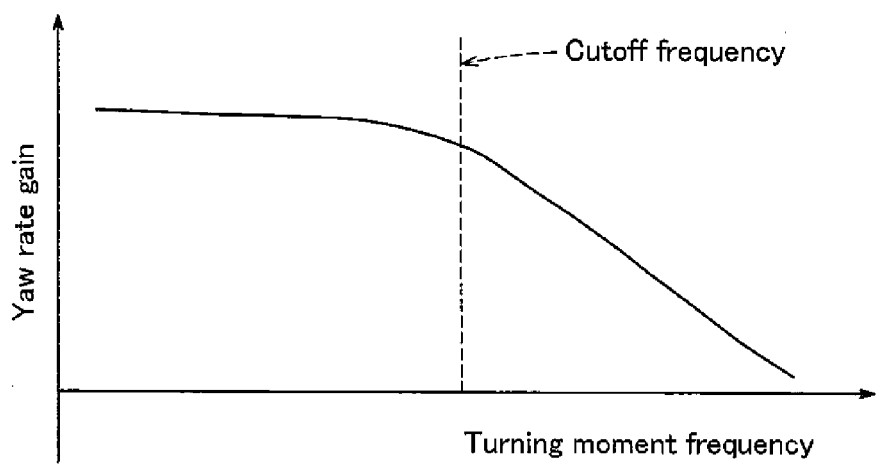
FIG. 4 is a graph showing the frequency characteristics of the yaw rate corresponding to the turning moment of a vehicle.

In particular, as shown in FIG. 4, the yaw rate corresponding to the vehicle turning moment tends to attenuate as the frequency of the turning moment increases within its range higher than the cut-off frequency. Thus, by knowing beforehand the cut-off frequency of the yaw rate and its attenuation rate, and by limiting the operating amplitudes of the respective electric brake devices 1 such that the frequencies of the fluctuations in braking forces generated by the compensation operations by the respective electric brake devices 1 are higher than the yaw rate cut-off frequency, and the yaw rate, which is attenuated, is not higher than an allowable upper limit value, the turning moment will not influence the vehicle behavior.

Figure 5:
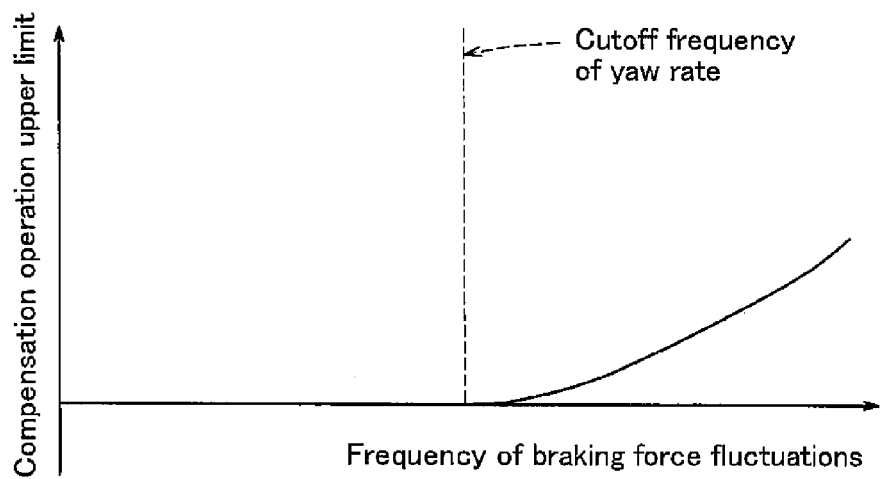
FIG. 5 is a graph showing how the amplitude of a compensation operation is determined according to the frequency of fluctuations in braking force.

Since, as described above, the yaw rate tends to attenuate as the frequency of the turning moment increases, the upper limit of the operating amplitudes of the respective electric brake devices 1 can be, as shown in FIG. 5, set at a higher value as the frequency of the braking force fluctuations increases within its range higher than the cut-off frequency of the yaw rate. By setting the upper limit of the operating amplitudes in this manner, it is possible to effectively reduce the braking force fluctuations. Also, since, generally speaking, the higher the operating frequency, the higher output is required for an electric motor, it is possible to more effectively reduce the outputs of the electric motors. The operating quantity calculating unit 3 of the control device 2 includes the above-described operating amplitude limiting function.

If the electric brake control system, of which the entirety is shown in FIG. 1, includes four electric brake devices mounted to the four (front two and rear two) vehicle wheels, respectively, with the four electric brake devices provided, respectively, on the first to fourth quadrants of the coordinate plane of which the origin is on the center of gravity of the vehicle, the control device 2 is configured to cause any electric brake device 1 in which the braking force is fluctuating and the electric brake device 1 located in the quadrant forwardly or rearwardly adjacent to the quadrant where there is the former electric brake device to perform the compensation operation.

With this arrangement, if the braking force on the rear right vehicle wheel is increasing, the braking force on the front right wheels decreases. This generates a clockwise turning moment due to imbalance in braking force between the right and left rear wheels, and a counterclockwise turning moment due to imbalance in braking force between the right and left front wheels, such that the clockwise turning moment and counterclockwise turning moment cancel each other. Since the turning moment generated between the front wheels and the turning moment generated between the rear wheels cancel each other, the vehicle behavior is less likely to be influenced by these turning moments. This makes it possible to increase the upper limit value of the operating amplitudes in the electric brake devices 1 which are performing the compensation operations, thereby effectively reducing fluctuations in braking force.

In this case, there is no need for the above-described function of setting the upper limit value of the operating amplitudes in the corresponding electric brake devices depending on the frequency of the braking force fluctuations.

Figure 6:
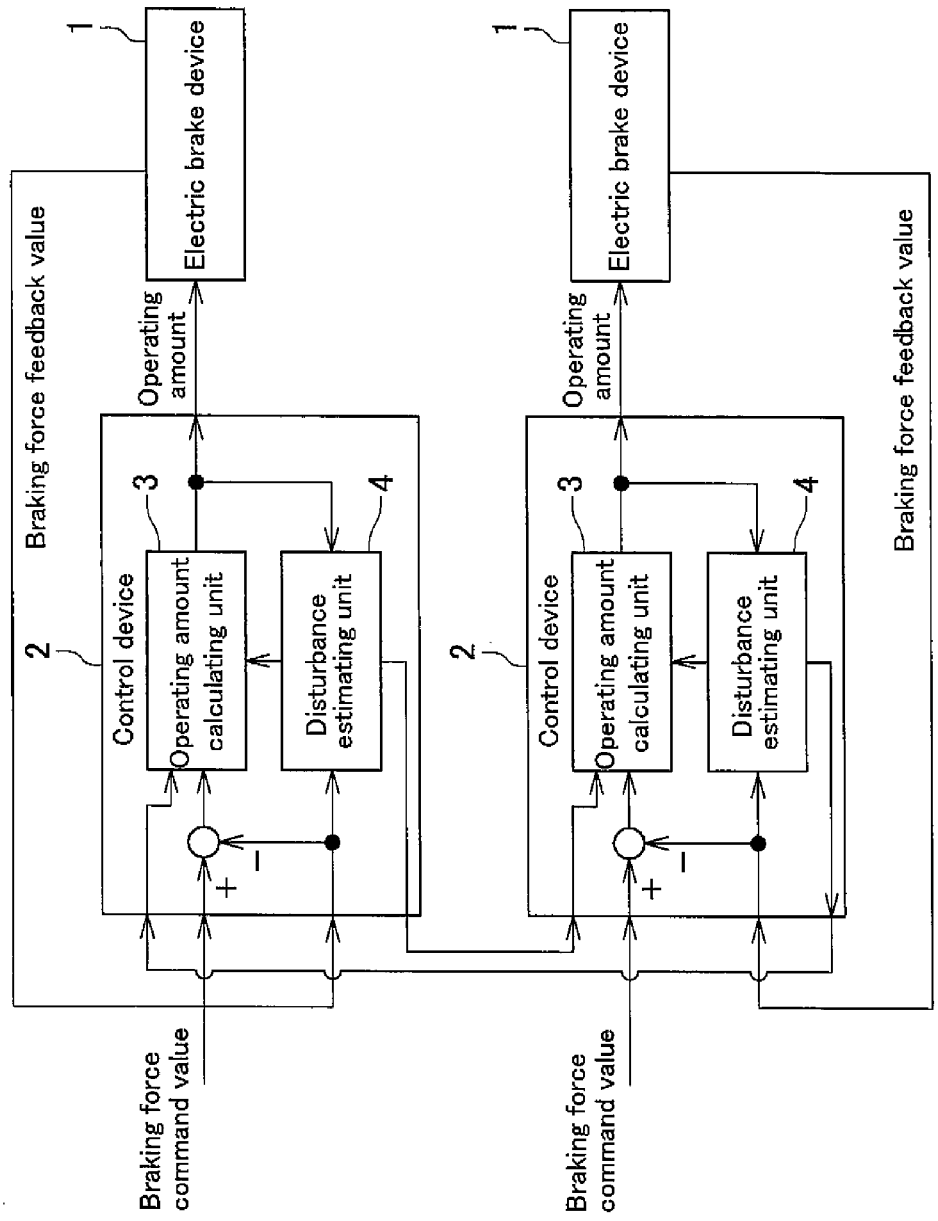
FIG. 6 shows an entire electric brake control system of a second embodiment.

FIG. 6 shows an electric brake control system of the second embodiment. The system of this embodiment includes two control devices 2 each including a disturbance estimating unit 4 for estimating disturbances that could cause fluctuations in the braking force, and corresponding to one of the electric brake devices 1. Each control device 2 receives a command value and a feedback value, of the braking force of the corresponding electric brake device 1. The disturbance estimating unit 4 of each control device 2 estimates disturbances based on the feedback value, and sends the thus estimated disturbances to the other electric brake device 1. Each control device 2 then calculates, in the operating quantity calculating unit 3, the operating quantity of the corresponding electric brake device 1 based on a deviation between the command value and the feedback value, and the estimated disturbances of both electric brake devices 1. The disturbance estimating unit 4 may be a full-order observer.

In particular, the control devices 2 may be configured such that the operating quantity of one of the electric brake devices 1 is obtained by adding the disturbances estimated by the corresponding disturbance estimating unit to the deviation between the command value and the feedback value of the one of the electric brake devices 1, and the operating quantity of the other of the electric brake devices 1 is obtained by subtracting the disturbances estimated by the corresponding disturbance estimating unit from the deviation between the command value and the feedback value of the other of the electric brake devices 1. In this arrangement, the braking force generated by the one of the electric brake devices 1 increases, while the braking force generated by the other electric brake device 1 decreases, so that the sum of these braking forces are kept constant.

Alternatively, the estimated disturbances for the respective electric brake devices 1 may be integrated and distributed to the respective control devices 2. For example, since, ordinarily, an electric brake device used for a front vehicle wheel is larger in maximum axial force than an electric brake device used for a rear vehicle, and its caliper body is higher in rigidity than that of the latter, by configuring the control system such that fluctuations in braking force generated in an electric brake device for a rear vehicle wheel are compensated for in an electric brake device for a front wheel, it is possible to effectively reduce fluctuations in the sum of the braking forces. Otherwise, after adding up the estimated disturbances of the respective electric brake devices 1, the value obtained by removing the low-frequency component from the sum of the disturbances may be entered into the respective control devices 2. Further alternatively, the system may be configured such that the operation amplitudes of the respective electric brake devices 1 differ from each other according to how the vehicle is pitching and rolling. Thus, it is possible easily control the braking forces taking into account the entire vehicle behavior.

The above-described operating amplitude limiting function may be provided in one or both of the operating quantity calculating unit 3 and the disturbance estimating unit 4, of each control device 2. For example, if the disturbance estimating unit 4 includes a high-pass filter, it is possible to limit estimated disturbances in the low-frequency region.

While the brake control system in any of the above embodiments includes two electric brake devices, the present invention is, needless to say, applicable to a brake control system including three or more electric brake devices.

DESCRIPTION OF THE NUMERALS

1. Electric brake device
2. Control device
3. Operating quantity calculating unit
4. Disturbance estimating unit

What is claimed is:

1. An electric brake control system comprising:
a plurality of electric brake devices, each of the electric brake devices being mounted to a corresponding one of a plurality of wheels of a vehicle, and each of the electric brake devices being configured to convert a rotary motion of an electric motor to a linear motion and apply a braking force to the corresponding one of the wheels; and
at least one control device for controlling braking forces of the respective electric brake devices,
wherein the control device is configured to cause, if braking force fluctuations occur in one of the electric brake devices, the one of the electric brake devices and another one of the electric brake devices to perform compensation operations for compensating for the braking force fluctuations occurring in the one of the electric brake devices while keeping constant a sum of the respective braking forces.

2. The electric brake control system of claim 1, wherein the control device is configured to determine operating amplitudes of the electric brake devices which are performing the compensation operations, based on a frequency of the braking force fluctuations, and frequency characteristics of a yaw rate corresponding to a braking force moment about a center of gravity of the vehicle.

3. The electric brake control system of claim 1, wherein at least one of the electric brake devices is located on each of first to fourth quadrants of a coordinate plane of which an origin is on a center of gravity of the vehicle, and wherein the control device is configured to cause the electric brake device in which the braking force fluctuations are occurring, and another one of the electric brake devices located on one of the first to fourth quadrants that is located adjacent, in a fore-and-aft direction of the vehicle, to one of the first to fourth quadrants where the electric brake device in which the braking force fluctuations are occurring is located, to perform the compensation operations.

4. The electric brake control system of claim 1, wherein the control device is configured to receive a command value of the sum, and feedback values, of the braking forces of the electric brake devices performing the compensation operations, and to calculate operating quantities of the electric brake devices performing the compensation operations based on a deviation between the command value and a sum of the feedback values.

5. The electric brake control system of claim 1,
wherein the at least one control device is a plurality of control devices, wherein each of the control devices includes a disturbance estimating unit for estimating disturbances that could cause fluctuations in braking force generated by a corresponding one of the electric brake devices, and
wherein the control devices are configured such that each of the control devices calculates an operating quantity of each of the electric brake devices performing the compensation operations, based on a deviation between a command value and a feedback value of a braking force, of a corresponding one of the electric brake devices, and disturbances estimated by a corresponding one of the disturbance estimating units.

6. The electric brake control system of claim 2, wherein the control device is configured to receive a command value of the sum, and feedback values, of the braking forces of the electric brake devices performing the compensation operations, and to calculate operating quantities of the electric brake devices performing the compensation operations based on a deviation between the command value and a sum of the feedback values.

7. The electric brake control system of claim 3, wherein the control device is configured to receive a command value of the sum, and feedback values, of the braking forces of the electric brake devices performing the compensation operations, and to calculate operating quantities of the electric brake devices performing the compensation operations based on a deviation between the command value and a sum of the feedback values.

8. The electric brake control system of claim 2, wherein the at least one control device is a plurality of control devices, wherein each of the control devices includes a disturbance estimating unit for estimating disturbances that could cause fluctuations in braking force generated by a corresponding one of the electric brake devices, and wherein the control devices are configured such that each of the control devices calculates an operating quantity of each of the electric brake devices performing the compensation operations, based on a deviation between a command value and a feedback value of a braking force, of a corresponding one of the electric brake devices, and disturbances estimated by a corresponding one of the disturbance estimating units.

9. The electric brake control system of claim 3, wherein the at least one control device is a plurality of control devices, wherein each of the control devices includes a disturbance estimating unit for estimating disturbances that could cause fluctuations in braking force generated by a corresponding one of the electric brake devices, and wherein the control devices are configured such that each of corresponding ones of the control devices calculates an operating quantity of each of the electric brake devices performing the compensation operations, based on a deviation between a command value and a feedback value of a braking force, of a corresponding one of the electric brake devices, and disturbances estimated by a corresponding one of the disturbance estimating units.

10. An electric brake control system comprising:

a plurality of electric brake devices, each of the electric brake devices being mounted to a corresponding one of a plurality of wheels of a vehicle, and each of the electric brake devices being configured to convert a rotary motion of an electric motor to a linear motion and apply a braking force to the corresponding one of the wheels of the vehicle; and at least one control device for controlling braking forces of the respective electric brake devices, wherein the wheels of the vehicle include a first wheel of the vehicle and a second wheel of the vehicle, wherein the electric brake devices include (i) a first electric brake device configured to apply a first braking force to the first wheel of the vehicle and (ii) a second electric brake device configured to apply a second braking force to the second wheel of the vehicle, and wherein when braking force fluctuations occurs in the first electric brake device, the control device causes the first electric brake device and the second electric brake device to perform compensation operations for compensating for the braking force fluctuations occurring in first electric brake device while keeping constant a sum of (i) the first braking force applied by the first electric brake device to the first wheel of the vehicle and (ii) the second braking force applied by the second electric brake device the second wheel of the vehicle.

* * * * *